UNITED STATES PATENT OFFICE 2,410,783

AGE RESISTERS

Albert F. Hardman, Akron, Ohio, assignor to Wingfoot Corporation, Akron, Ohio, a corporation of Delaware No Drawing. Application February 26, 1943, Serial No. 477,264

2 Claims. (Cl. 260—313)

This invention relates to the compounding of rubber and more particularly to the provision and use of novel age resisters for rubber.

It is known that acetonyl acetone reacts with various primary amines to form N-substituted 2,5-dimethyl pyrroles. The reaction may be represented by the following equation:

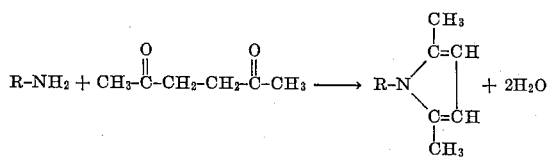

It has now been discovered that p-aminophenols will similarly react with acetonyl acetone and similar 1,4-diketones and that the products are excellent age resisters for rubber. The age resisting properties of the products are highly specific, since other related pyrroles, even when prepared from closely analogous amines, are not effective age resisters. It is believed that the pyrroles derived from p-aminophenols are novel.

The preparation of the age resisters is illustrated by the following example:

Example

A mixture of 55 grams of p-aminophenol and 70 grams of acetonyl acetone was heated in a Claisen flask connected to a condenser and receiver. Water came off freely at 105–110° C. The heating was continued over a period of half an hour, the temperature reaching 200° C. The residue was distilled under reduced pressure, the product coming off at about 175° C. and 7 mm. pressure. The yield was 72 grams or 77% of the theoretical. The product thus obtained melted at 105° C. and, when recrystallized from benzene, melted at 106–107° C. Analysis showed a nitrogen content of 7.52%. The calculated nitrogen content is 7.48%, based on the formula

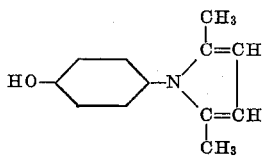

The product of the example, unlike p-aminophenol, is very readily soluble in all of the common solvents, even including gasoline and petroleum ether.

Other analogous pyrroles may be similarly prepared by using other p-aminophenols and other aliphatic 1,4-diketones in place of the starting materials employed in the example. Thus, p-amino-α-naphthol may be used instead of p-aminophenol. Also, the aminophenol may contain on the aryl ring various further substituents such as alkyl, aryl, aralkyl, alkoxy, aryloxy, halogen, hydroxyl, etc. groups, such substituted compounds being full equivalents, for purposes of the present invention, of the strictly aryl p-aminophenols. In the same manner, the 1,4-diketone may contain various substituents without markedly modifying or detracting from the age-resisting properties of the resultant pyrrole. The products may be designated as N-(p-hydroxy aryl) pyrroles.

The product of the example was incorporated into rubber as an age resister in accordance with the following formula. Samples were cured and were then tested before and after aging for 6 days in an oxygen bomb at 50° C. and 150 pounds per square inch oxygen pressure.

Formula

| | Parts by weight |
|---|---|
| Extracted rubber | 100.0 |
| Zinc oxide | 5.0 |
| Sulfur | 3.0 |
| Hexamethylene tetramine | 1.0 |
| Stearic acid | 1.5 |
| Age resister | 1.0 |

The tensile strength was 20% higher after aging than it was before aging. (A control using phenylbetanaphthylamine as the age resister showed a 13% increase in tensile strength.)

I claim:

1. As new compounds, N-(p-hydroxyaryl) pyrroles having the structural formula

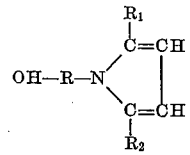

in which OH—R— is a para-hydroxy aryl radical and R1 and R2 are aliphatic.

2. As a new compound, N-(p-hydroxyphenyl)-2,5-dimethyl pyrrole, which has the structural formula

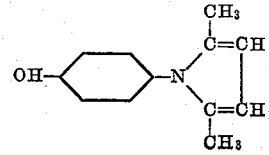

ALBERT F. HARDMAN.